April 27, 1943.  W. E. LANHAM  2,317,540
SLICING MACHINE
Filed Aug. 21, 1941  2 Sheets-Sheet 1

INVENTOR.
William E. Lanham
BY Cooper, Kerr & Dunham
ATTORNEYS

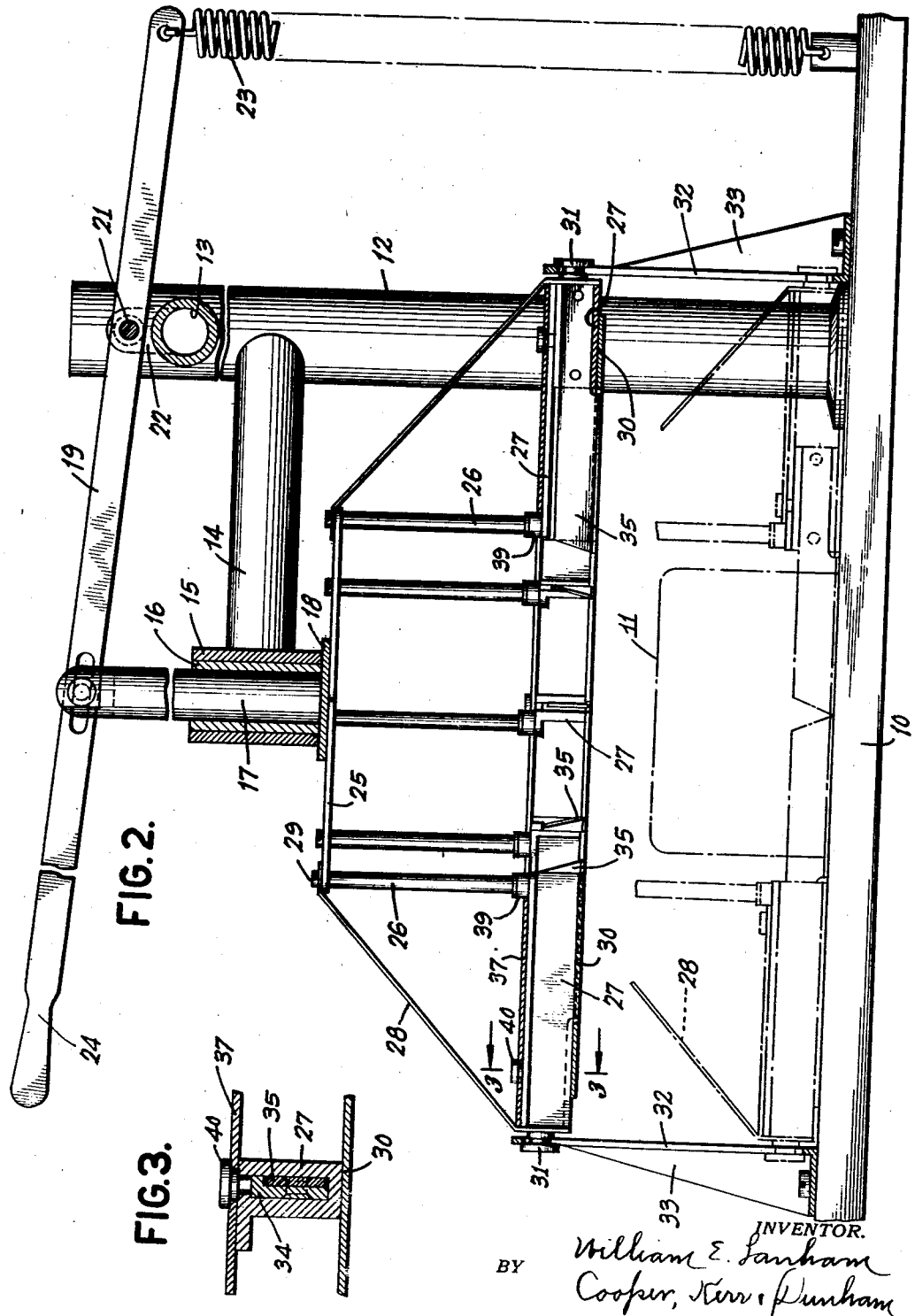

Patented Apr. 27, 1943

2,317,540

UNITED STATES PATENT OFFICE 2,317,540

SLICING MACHINE

William E. Lanham, Atlanta, Ga., assignor to Columbia Baking Company, Atlanta, Ga., a corporation of Delaware Application August 21, 1941, Serial No. 407,698

7 Claims. (Cl. 30—114)

This invention relates generally to cutting or slicing apparatuses and has particular reference to devices of that general character constructed to cut or slice bakery products.

A broad object of the invention is to provide a simple and compact cutting or slicing machine which can be used conveniently to cut bakery products into portions.

Another object is to provide an apparatus of the character stated which can be constructed at a low cost. This makes it possible not only to use the device in a bakery but, because of the low cost, it can also be supplied for use in retail stores having a need for such a device.

Another object is to provide a cutting or slicing machine having a plurality of knives for cutting or slicing an article deposited on a supporting base, and which is so constructed that the knives may be simultaneously moved into positions over the base preparatory to giving them a cutting movement toward the base and simultaneously withdrawn from over the base after the cutting movement is effected to prevent disarranging the sliced portions and permit removal of the sliced article from the base.

Another object is to provide an apparatus which is capable of being operated to advance a set of knives edgewise to cut or slice an article and during said advance or at any stage of it, moving the knives endwise to facilitate the cutting or slicing operation. The construction is such that the knife edge may be pressed into cutting engagement with the material of the article and the knives reciprocated one or more times as desired while the pressure is maintained, thereby preventing any compacting of the material under or in the path of the cutting edges of the knives. In this aspect of the invention a plurality of knives may be simultaneously operated to cut or slice an article by movements closely simulating the cutting movements of a single hand-held knife.

Another object is to provide an apparatus having the characteristics and advantages stated which can be used for cutting round bakery products such as cakes into equal segments.

With the foregoing and other objects in view, all of which will become more apparent later on, the invention consists in a novel construction and relation of parts, one embodiment of which is shown in the drawings accompanying and forming a part of this specification, and the novel features of which are pointed out in the claims appended hereto.

In said drawings:

Fig. 2 is a section along the line 2—2 of Fig. 1.

Fig. 3 is a section along the line 3—3 of Fig. 2.

Figure 1:
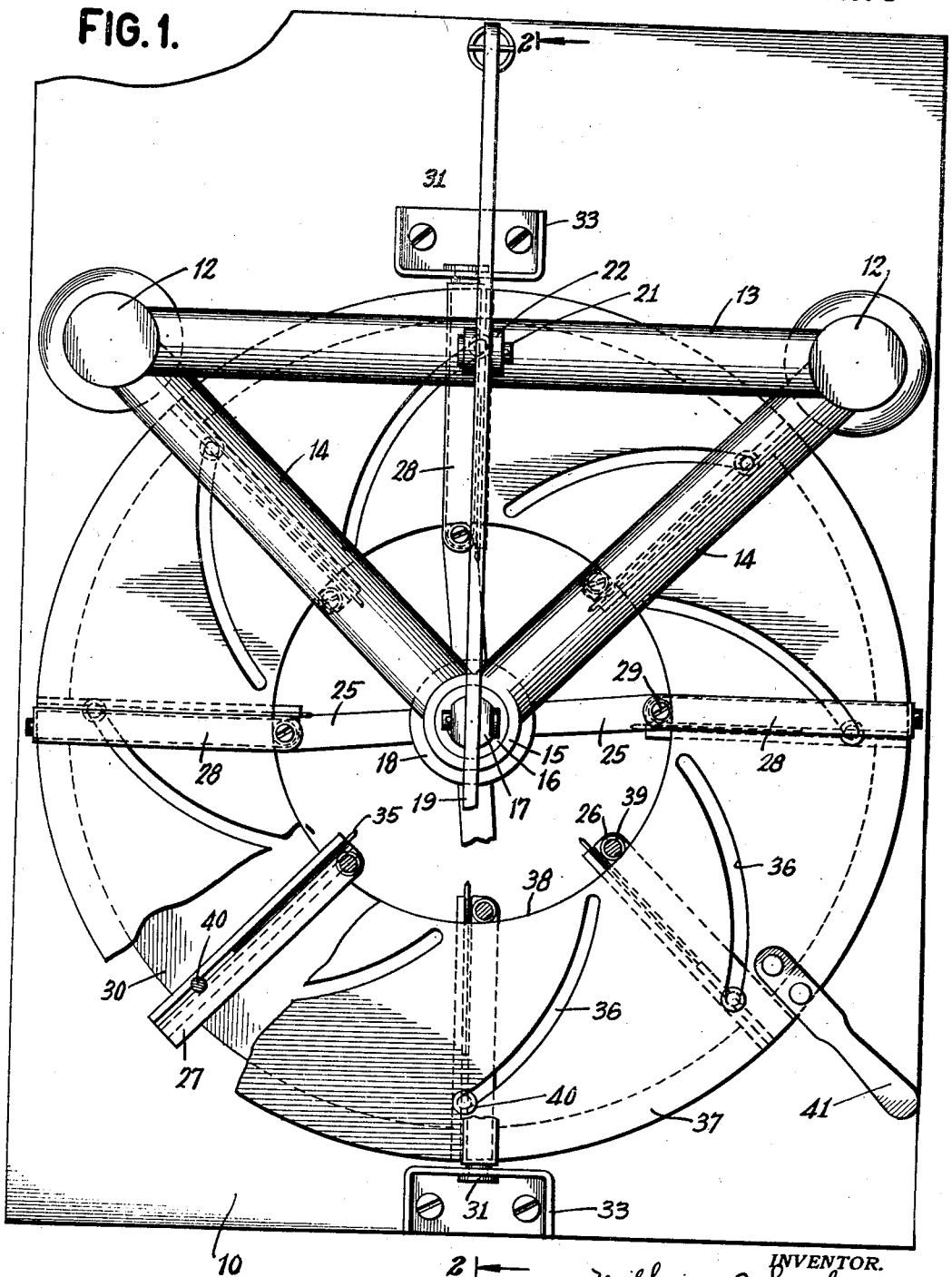
Fig. 1 is a plan view of a machine containing an embodiment of the inventions.

The illustrative embodiment shown in the drawings is constructed to cut round articles such as cakes and the like. It includes a base 10 having a central space upon which the article 11 is deposited. The base may be suitably marked for convenience in locating the article so as to center it with respect to the cutting or slicing part of the apparatus.

Projecting upward from the base 10 are two standards 12. These standards are connected near their tops by a cross bar or tube 13 and each of them supports a bar or tube 14, the bars 14 being arranged to converge as shown in Fig. 1. The converging ends of the tubes or bars 14 carry a fixed tubular member 15. Secured within the tubular member 15 is a bearing sleeve 16 of any desired composition.

Sliding within the bearing sleeve 16 is a rod 17, to the lower end of which is attached a disk 18. Parts which are hereinafter collectively referred to as the knife carrier are attached to the disk 18.

The upper end of the rod 17 is slotted vertically to receive a lever 19, the rod 17 and lever 19 being connected together by a slot and pin. The lever 19 is pivoted at 21, Fig. 2, between ears 22 extending upward from the cross rod or bar 13. The rear end of the lever 19 is connected by a return spring 23 to the base 10. It is apparent that when the forward end 24 of the lever is depressed manually the spring 23 will be stretched and the knife carrier parts supported by the rod 17 and disk 18 will be moved downward and that as the manual pressure on the end 24 of the lever 19 is released, the return spring 23 will move the lever and connected parts including the knife carrier to the positions in which they are shown in Fig. 2. The downward position of the carrier is indicated by dotted lines in the lower part of the figure last referred to.

The knife carrier includes a plurality of arms 25 secured to and projecting radially from the disk 18. At their outer ends these arms are attached by screws 29 to the upper ends of rods 26, each of which rods is attached at its lower end to one of a set of knife guides 27. The other ends of the knife guides are supported by inclined members 28 attached at their lower ends to the ends of the guides and held at their upper ends by the screws 29 which connect the arms 25 and the rods 26, the construction being such that the rods 26 and members 28 support the knife guides in positions parallel to the base 10. A ring or open disk 30 is attached to the under sides of the knife guides and holds the guides in the proper relative positions. Two of the knife guides are provided at their outer ends with rollers or extensions 31 working in guide slots 32 of standards 33 attached to and extending upward from the base 10. The slots 32 are vertical and the knife carrier is therefore limited to a reciprocatory up and down movement.

The knife guides may be constructed in any suitable way, a preferred arrangement being shown in Fig. 3. As there illustrated each guide is constructed to form a slot in which is slidably mounted a bar 34 to which is riveted or otherwise secured a knife blade 35. Secured to each of the bars 34 is a headed stud 40 which passes through one of the cam slots 36 in a circular plate 37 having a central circular opening 38 engaging collars 39 on the lower ends of the rods 26. Fastened to the circular plate is a handle 41 by means of which the plate may be oscillated, causing the cam slots 36 to move the bars 34 and knives 35 attached thereto endwise in the guides. The cam plate may be turned in one direction at the beginning of the operation to cause the cam slots 31 to slide the knives 35 endwise in the guides 27 until the points or ends of the knives are substantially in contact at the center of the circular opening 38. This will set up a set of converging knives which, when the knife carrier is depressed by means of the handle 24 will cut a round article 11 into equal segments. At the end of the downward or cutting movement of the knife carrier and knives, the handle 41 on the cam plate 37 may be moved in the proper direction to withdraw the knives into the guides 27 before the knife carrier is freed for return to its upper position by the return spring 23.

Some baked materials have a tendency to compact under the edge of a knife and it is desirable to offset this tendency by drawing the knife endwise as a part of the cutting operation. The apparatus shown and described is so constructed that the knife carrier and the knives therein may be depressed in a sort of step-by-step movement accompanied by operations of the cam plate handle 41 to cause a drawing movement of the knives so as to have a shearing effect upon the material being sliced. With a little practice the machine can be operated on any kind of material with any sort of a combination of pressure and drawing movement of the knives so that any knife movement found advisable when using a hand-held knife to slice the article may be duplicated with a plurality of simultaneously operated knives by proper manipulations of the knife carrier lever 24 and cam plate handle 41. If the article is of such texture as to permit it, the knife carrier can be lowered to slice through the article 11 by simply an edgewise movement of the knives and the knives then moved back into their guides so as to prevent disarranging the cut portions and incidentally to prevent any interference by the knives with the removal of the article. It is preferred to have the range of up and down movement of the knife carrier sufficient in extent to hold all parts of the carrier and the knives thereon well above the article in the normal position of the parts, this position being illustrated in full lines in Fig. 2 of the drawings.

It is clear that the apparatus shown and described is simple in its construction and operation and that it is also very efficient in accomplishing the intended purpose.

The illustrative embodiment has been described in considerable detail, but it is apparent that the invention can be embodied in other forms of mechanism. For example, it is obvious the mechanism may readily be adapted to cut articles other than round ones with suitable changes in the shapes and relations of the various parts of the mechanism. Other changes can be made according to the nature of the article to be cut or sliced and it is not the desire to be limited by anything shown or described except to the extent indicated in the claims which follow.

What is claimed is:

1. In an apparatus of the character described, the combination of a base to receive the article which is to be sliced, a knife carrier, means mounting said carrier for movement toward the base, a plurality of knives mounted for reciprocatory movement in said carrier along lines converging at a common center, means for manually operating the carrier to cause the knives mounted therein to cut through the article, and means for simultaneously reciprocating said knives during the said movement of the carrier.

2. In an apparatus of the character described, a base to receive the article which is to be sliced, a knife support, a stationary support overhanging the base in which the knife support is mounted for movement toward and away from said base, a plurality of knives mounted for endwise movement in said knife support with their edges facing said base, and separate manually operable means for simultaneously moving the knife support and actuating the knives whereby to effect both edgewise and endwise movements of the knives in slicing the article.

3. In an apparatus of the character described, a base to receive the article which is to be sliced, a plurality of knives for slicing the article, a support for the knives, means mounting said support for movement to impart simultaneously edgewise movements to the knives, and means manually operable as desired to effect simultaneous endwise movement of the knives relative to the support preparatory to or at any point in the edgewise movement of the knives.

4. In an apparatus of the character described, a base to receive the article which is to be sliced, a knife support, means mounting said support for movement toward and away from said base and means for moving said support in both directions, a plurality of knives mounted for reciprocatory movements in said support, a member mounted on and manually movable relative to said support constructed to provide a cam for each knife, and a projection extending from each knife engaging the corresponding cam whereby manual movements of said member will cause reciprocations of the knives in any position of the knife support.

5. In an apparatus of the character described, a base to receive the article which is to be sliced, a circular knife support, means mounting said support for reciprocatory movement toward and away from said base, means comprising a manually operable lever for moving the knife support downward and a return spring connected to the lever for moving the knife support upward, a plurality of knives mounted for reciprocatory movement in and radially of the knife support, a cam plate rotatably mounted on and concentric with the knife support constructed to provide a cam slot for each knife, a projection on each knife engaging one of the cam slots, and means for manually rotating the cam plate to effect reciprocations of the knives in any position of the knife support.

6. In an apparatus of the character described, a base to support the article which is to be sliced, a knife carrier, means mounting said carrier for movement toward and away from said base and means for effecting said movements, a plurality of knives movably supported by said carrier, and devices including a manually operable handle for moving the knives relative to the carrier to cutting positions over the base before the movement of the carrier toward the base is started and then withdrawing them from over the base after the movement of the carrier away from the base is completed.

7. In an apparatus of the character described, a base to receive the article which is to be sliced, a knife carrier movable toward and away from said base, a stationary support overhanging said base comprising means for guiding said movements of the knife carrier, a plurality of knives movably mounted in said carrier, devices for actuating the knives to project them over said base preparatory for slicing and withdrawing them from over the base after the slicing has been effected, manually operable means for moving the carrier and knives toward said base, and a return spring connected to said means for moving the carrier away from and holding it away from said base.

WILLIAM E. LANHAM.